United States Patent [19]
Yanagisawa

[11] Patent Number: 5,973,883
[45] Date of Patent: Oct. 26, 1999

[54] MAGNETIC HEAD SUPPORTING MECHANISM

[75] Inventor: Masahiro Yanagisawa, Tokyo, Japan

[73] Assignee: NEC Corporation, Tokyo, Japan

[21] Appl. No.: 08/873,558

[22] Filed: Jun. 12, 1997

Related U.S. Application Data

[63] Continuation of application No. 08/550,774, Oct. 31, 1995, abandoned.

[30] Foreign Application Priority Data

Oct. 31, 1994 [JP] Japan .................................... 6-266908

[51] Int. Cl.⁶ ............................... G11B 5/53; G11B 21/20
[52] U.S. Cl. ............................................................. 360/104
[58] Field of Search ..................................... 360/104, 105, 360/106; 73/861.73

[56] References Cited

U.S. PATENT DOCUMENTS

| | | | |
|---|---|---|---|
| 4,718,285 | 1/1988 | Pfeiffer | 73/861.73 |
| 5,408,372 | 4/1995 | Karam, II | 360/104 |
| 5,454,158 | 10/1995 | Fontana, Jr. et al. | 360/104 |
| 5,455,727 | 10/1995 | Baral et al. | 360/104 |
| 5,461,525 | 10/1995 | Christianson et al. | 360/104 |

OTHER PUBLICATIONS by Bharat Bhusan, "Tribology and Mechanics of Magnetic Storage Devices", Springer Verlag in 1990.

*Primary Examiner*—Robert S. Tupper
*Attorney, Agent, or Firm*—Young & Thompson

[57] ABSTRACT

In order to enhance the rigidity of a magnetic head slider 2 in the seeking direction without increasing its rigidity in the tracking direction, convex parts 4 parallel to the seeking direction are provided on the surface of a supporting spring 3.

4 Claims, 3 Drawing Sheets

CE: COMPARATIVE EMODIMENT

MAGNETIC HEAD SUPPORTING MECHANISM

This application is a continuation of application Ser. No. 08/550,774, filed Oct. 31, 1995, now abandoned.

BACKGROUND OF THE INVENTION

The present invention relates to a magnetic head supporting mechanism for keeping a magnetic head stably afloat over a recording medium.

In recent years, recording density is steadily increasing in the field of information memory files. For magnetic disk apparatuses, narrowing the gap (hereinafter called spacing) between the magnetic head for reading and writing information and the magnetic recording medium for holding information is an essential element of increasing the recording density. Along with the narrowing of the spacing, the frequency of contacts between the magnetic head and the magnetic recording medium increases, giving rise to a problem of faster wear. Especially, any vibration of the magnetic head would bring the head into contact with the magnetic recording medium more frequently.

The vibration of the magnetic head mainly occurs in either or both of two modes: pitching in the running direction of the magnetic recording medium or the magnetic head, and rolling in the seeking direction (the radial direction of the recording medium). Wear due to the latter poses a particularly serious problem.

As a prior art to reduce this rolling, what is illustrated in FIG. 1 is known to persons skilled in the art. In a magnetic head supporting mechanism 51 shown in FIG. 1, a magnetic head slider 2 is fastened to one end of a supporting spring 3. Each side end of this supporting spring 3 in the seeking direction is bent in an L shape. This magnetic head supporting mechanism increases the rigidity of the magnetic head in the seeking direction and reduces rolling by forming these L-shaped edges. This prior art is described, for example, "Tribology and Mechanics of Magnetic Storage Devices" written by Bharat Bhusan and published by Springer Verlag in 1990.

However, if the spacing is reduced to less than 0.5 micrometer, a supporting spring with L-shaped side edges will prove insufficient in rigidity in the seeking direction and difficult to prevent wear due to rolling. On the other hand, along with the reductions of the magnetic head in size and load, it becomes necessary to extremely reduce the thickness of the supporting spring to minimize the pressing load of the supporting spring. Yet, a thin supporting spring with L-shaped edges would be unable to keep a sufficient degree of rigidity in the seeking direction. Furthermore, L-shaped edges increase rigidity also in the direction 8 vertical to the magnetic recording medium, resulting in an increased pressing load on the recording medium.

SUMMARY OF THE INVENTION

The present invention, therefore, is intended to achieve the aforementioned object by adopting a configuration in which are provided, on the surface of a supporting spring to support a magnetic head slider, seeking-direction rigidity-keeping members which enhance the rigidity of the supporting spring in the seeking direction without increasing its rigidity in the tracking direction.

A supporting spring for holding a magnetic head according to the invention has on its surface convex parts which are parallel to the seeking direction. As a result, the rigidity of the spring in the seeking direction is enhanced, and at the same time its resonance frequency is increased to reduce vibration. This makes its contacts with the magnetic recording medium less frequent.

Such convex parts are formed by forming a coat of a resist over a thin sheet, which is to be used as supporting spring, of a metallic material such as phosphor bronze or stainless steel or a ceramic material such as alumina or silicon, exposing the sheet to light through a mask, etching the sheet with ferrous chloride, aqua regia, hydrofluoric acid, a mixture of hydrofluoric acid and nitric acid or an etching solution, such as KOH, and removing the resist with a parting agent (this process is hereinafter called photolithography). The convex parts increase the rigidity in the seeking direction without increasing the pressing load substantially.

A supporting spring according to another aspect of the invention, having bent parts parallel to the seeking direction, is also more rigid than the conventional in the seeking direction, at the same time increased in resonance frequency, and reduced in vibration. As a result, its contacts with the magnetic recording medium are made less frequent.

Such bent parts are formed by pressing a thin sheet of a metallic material, such as phosphor bronze or stainless steel. These parts, like the aforementioned convex parts, can increase the rigidity of the spring in the seeking direction while keeping the pressing load small.

A feature of the convex parts formed by etching is their high aspect ratio (the ratio of the height to the width of each convex part, which can range from, e.g., 1 to 20). The pressing of bent parts can achieve no higher aspect ratio than 1, but is easy to accomplish. It is essential that said convex or bent parts should be provided in parallel to the seeking direction. L-shaped edges, if provided vertically to the seeking direction as on the conventional head, cannot substantially enhance the rigidity of the spring in the seeking direction.

DETAILED DESCRIPTION OF THE PREFERRED EMBODIMENTS

Figure 2:
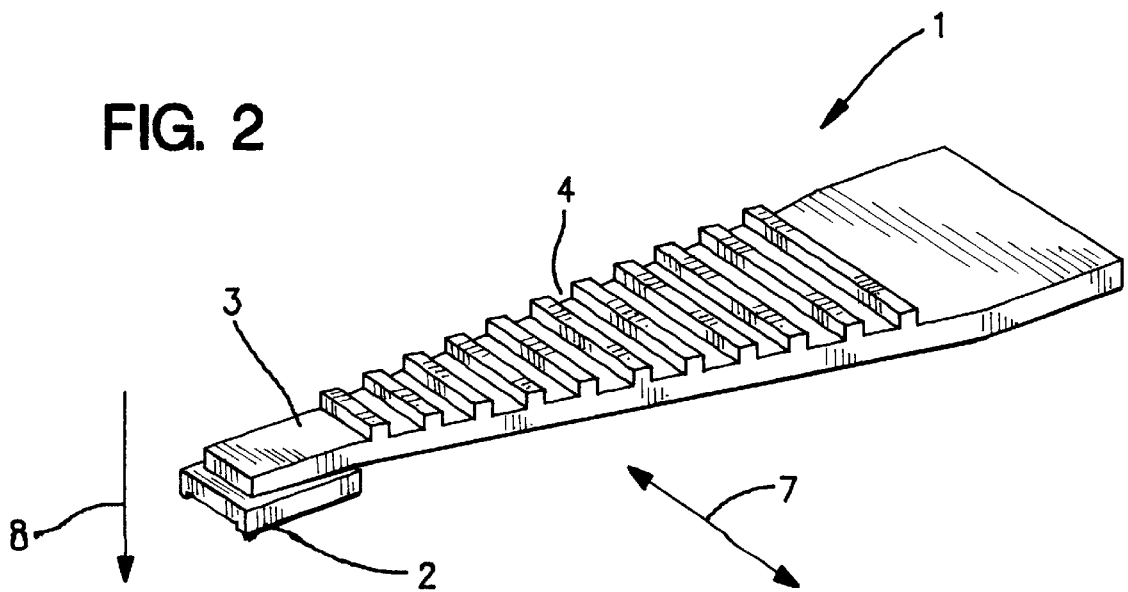
FIG. 2 illustrates a first basic structure according to the present invention for magnetic head supporting mechanisms.

FIG. 2 illustrates a first basic structure according to the present invention for magnetic head supporting mechanisms. This first basic structure, as shown in FIG. 2, consists of a magnetic head slider 2, and a supporting spring 3, to one end of which is fastened the magnetic head slider 2 and on the surface of which are provided a plurality of convex parts 4 in parallel to the head's seeking direction 7. This first basic structure is increased in rigidity in the seeking direction by the plurality of convex parts provided on the surface of the supporting spring in parallel to the seeking direction of the magnetic head. These convex parts can be produced by coating the supporting spring with a resist, exposing the spring to light through a mask, etching the spring with an etching solution, and removing the resist with a parting agent. After that, the magnetic head slider is fastened to one end of the supporting spring.

On the basis of this first basic structure, the following Embodiments 1 through 4 were fabricated for trial.

Embodiment 1

As Embodiment 1, a magnetic head supporting mechanism was prepared by using a supporting spring made of a silicon sheet. This supporting spring measures 10 mm in length and, in width, 0.5 mm in the part fastened to the magnetic head slider and 1.0 mm in the base part. It is 30 micrometers thick. The convex parts are 5 micrometers wide and 2.5 to 20 micrometers high (having aspect ratios of 0.5 to 10). Etching was accomplished with KOH.

Embodiment 2

Next, as Embodiment 2, what is equal to Embodiment 1 in dimensions was prepared by the same process by using a supporting spring made of alumina.

Embodiment 3

Furthermore, as Embodiment 3, what is equal to Embodiments 1 and 2 in dimensions was prepared by using a supporting spring made of stainless steel. Its convex parts were formed by etching with ferrous chloride.

Embodiment 4

Also, as Embodiment 4, what is equal to Embodiments 1, 2 and 3 in dimensions was prepared by using a supporting spring made of phosphor bronze.

Figure 3:
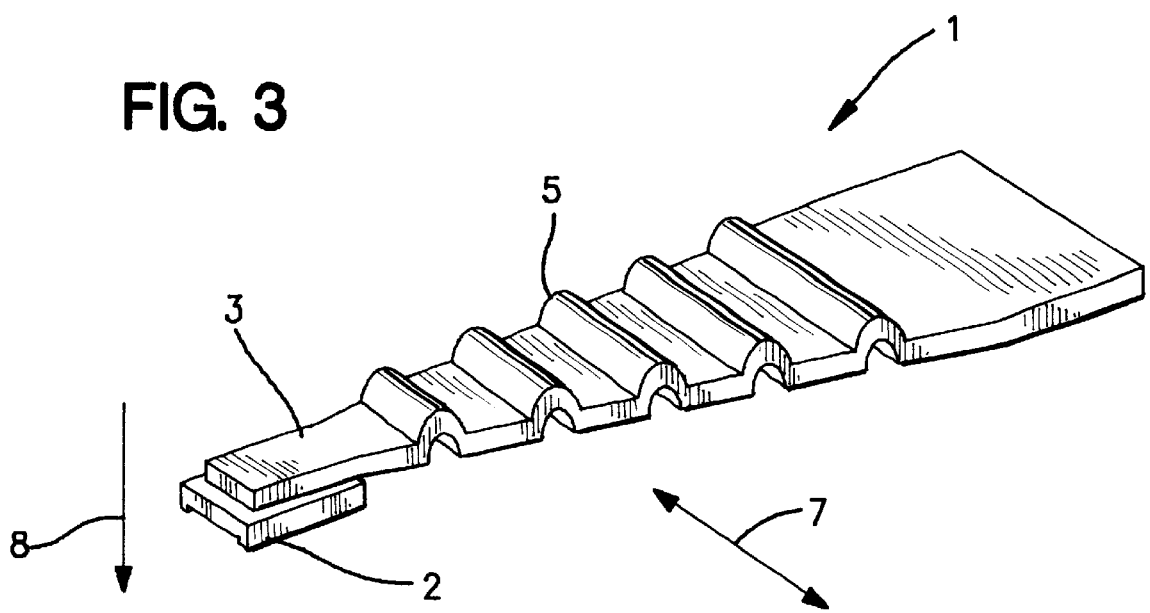
FIG. 3 illustrates a second basic structure according to the invention for magnetic head supporting mechanisms.

Now, with reference to FIG. 3, a second basic structure according to the present invention will be described. As illustrated in FIG. 3, the second basic structure consists of a magnetic head slider 2, and a supporting spring 3a, to one end of which is fastened the magnetic head slider 2 and on the surface of which are provided a plurality of bent parts 5 in parallel to the head's seeking direction 7.

This second basic structure is increased in rigidity in the seeking direction by the plurality of bent parts provided on the surface of the supporting spring in parallel to the head's seeking direction 7. Furthermore, by providing this plurality of bent parts, the resonance frequency is increased, and the vibration of the head is thereby reduced with the result that the contacts between the magnetic recording medium and the magnetic head slider can be made less frequent.

On the basis of this second basic structure, the following Embodiments 5 and 6 were fabricated for trial.

Embodiment 5

On the surface of a supporting spring 3 made of a stainless steel sheet, measuring in width from 0.5 mm (in the part fastened to the magnetic head slider) to 1.0 mm (in the base part), 10 mm in length, and 5 micrometers in thickness, bent parts 5 of 100 micrometers in width and 0.05 to 0.1 micrometer in height, i.e. having aspect ratios of 0.05 to 0.1, were formed by pressing. Bent parts of 100 micrometers in height having aspect ratios of 0.5 and 1.0 were also prepared.

Embodiment 6

In the same manner as for Embodiment 5, bent parts 5 were prepared by pressing, with the supporting spring being made of phosphor bronze.

The foregoing Embodiments 1 through 6 were designed to give the magnetic head slider 2 a spacing of 0.05 micrometer.

In order to verify the benefits of Embodiments 1 through 6, three comparable embodiments were also fabricated for trial.

Comparable Embodiment 1

A magnetic head supporting mechanism having neither bent parts nor convex parts was produced in the same manner as Embodiment 1 was.

Comparable Embodiment 2

A magnetic head supporting mechanism having neither bent parts nor convex parts was produced in the same manner as Embodiment 5 was.

Comparable Embodiment 3

Figure 1:
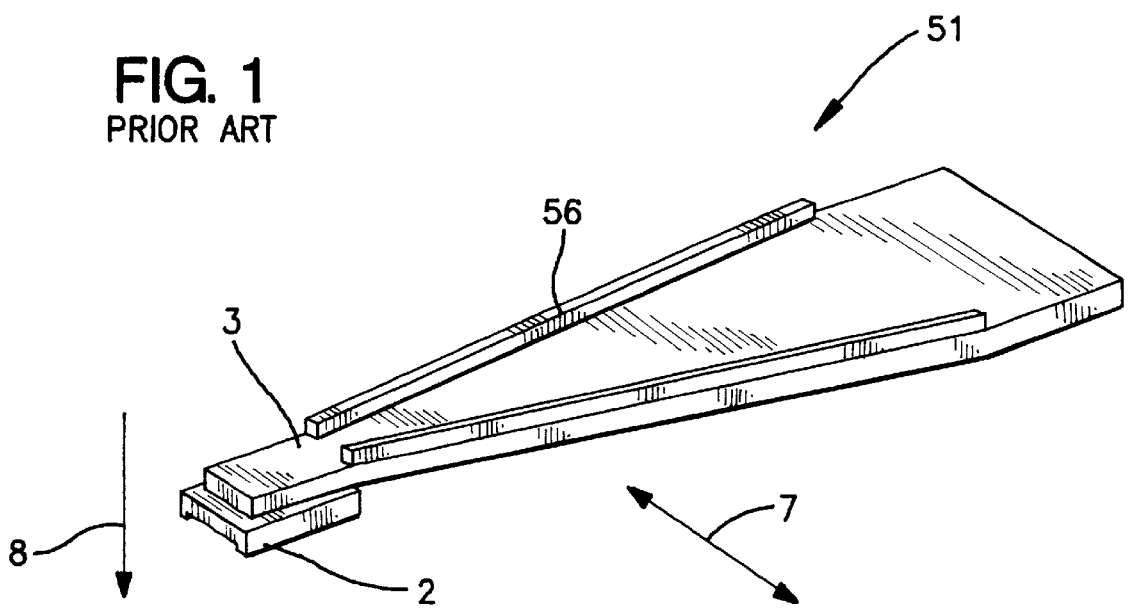
FIG. 1 illustrates the configuration of a magnetic head supporting mechanism according to the prior art.

A magnetic head supporting mechanism 51 with a conventional supporting spring 3 having L-shaped edges 56, such as shown in FIG. 1, was produced. The spacing of the conventional magnetic head is 0.2 micrometer. The conventional supporting spring 3, measuring in width from 2.0 mm (in the part fastened to the magnetic head slider) to 6.0 mm (in the base part), is made of a stainless steel sheet of 100 micrometers in thickness.

A magnetic head 1 was fabricated by fastening a magnetic head slider 2 to the tip of the supporting spring 3 of each of Embodiments 1 through 6 and Comparable Embodiments 1 through 3. The frequency characteristic of the amplitude was checked when the magnetic head 1 was oscillated in the seeking direction 7, and the load was measured when the magnetic head 1 was pressed in the pressing direction (the direction of the magnetic recording medium) 8 until the supporting spring 3 became parallel to the surface of the magnetic recording medium.

Furthermore, by using the Embodiments and the Comparable Embodiments, tests were carried out to move each magnetic head 1 repeatedly in the seeking direction 7 for 1 hour, and to measure the frequency of contacts between the magnetic head slider and the magnetic disk medium and the degrees of wear of the magnetic head slider and of the surface of the magnetic disk medium (seek-contact and wear tests). In these tests, an electric field of 10 millivolts was applied to each magnetic head slider to detect, and count the frequency of, contacts between the magnetic head slider and the magnetic disk medium. The spacings of the magnetic head sliders were equalized by adjusting the rotating speed of each magnetic recording medium appropriately.

Figure 4:
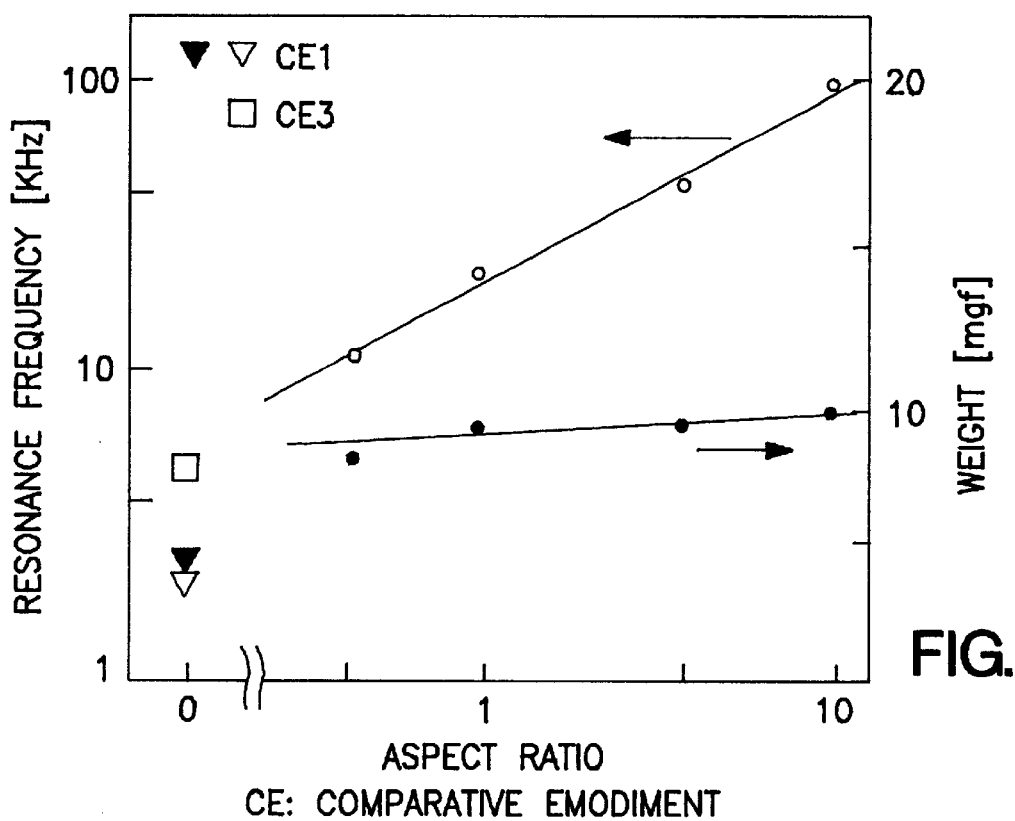
FIG. 4 shows the relationships between the resonance frequency and the aspect ratio in magnetic heads which are Embodiment 1 of the invention, and comparable embodiments 1 and 3.
Figure 5:
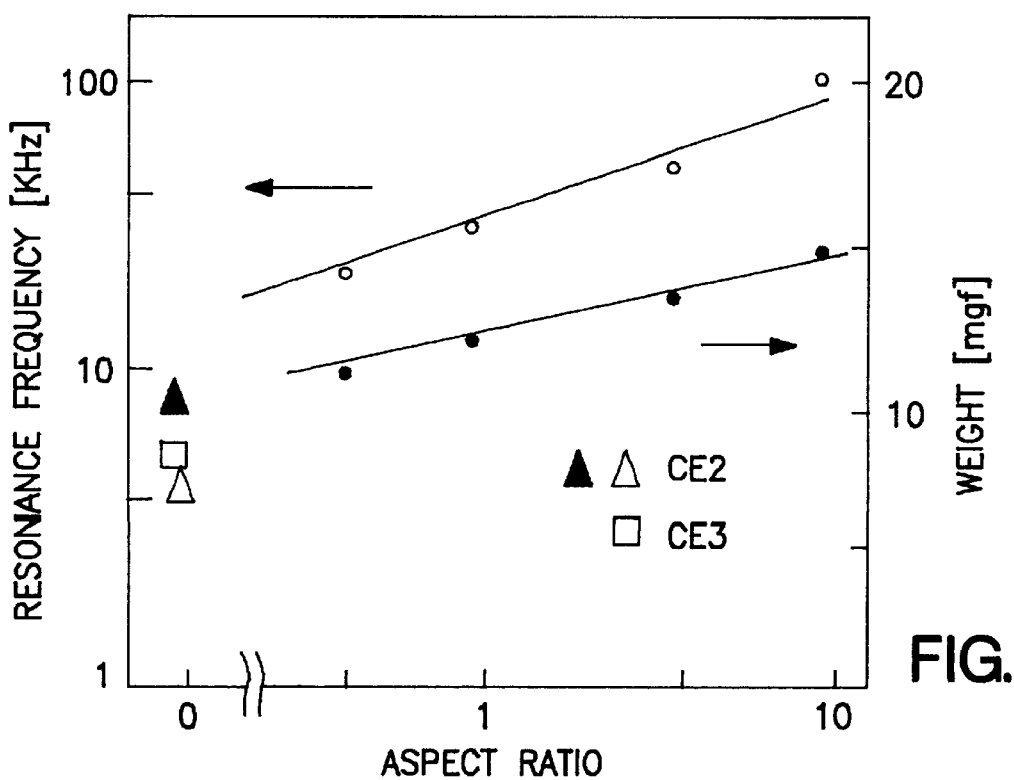
FIG. 5 shows the relationships between the resonance frequency and the aspect ratio in magnetic heads which are Embodiment 5 of the invention, and comparable embodiments 2 and 3.

The results of these tests have revealed that, as shown in FIG. 4, the resonance frequency of the magnetic head of Embodiment 1 in the seeking direction increases with the aspect ratio, and is far higher than that of Comparable Embodiment 1 having no convex parts or the conventional head (Comparable Embodiment 3) having L-shaped edges. On the other hand, the load on the magnetic head of Embodiment 1 is only 1.5 to 2 times as great as that on the magnetic head of Comparable Embodiment 1 having no convex parts. It is also seen that the resonance frequency of the magnetic head of Embodiment 5 in the seeking direction, as shown in FIG. 5, increases with the aspect ratio, and is far higher than that of Comparable Embodiment 2 having no convex parts or the conventional head (Comparable Embodiment 3) having L-shaped edges. At the same time, the load on the magnetic head of Embodiment 5 is no more than 1.1 to 1.5 times as great as that on the magnetic head of Comparable Embodiment 2 having no convex parts.

The magnetic heads of Embodiments 2, 3 and 4 were also confirmed to have the same effects as that of Embodiment 1 shown in FIG. 4. The magnetic head of Embodiment 6 gave substantially the same effects as Embodiment 5 shown in FIG. 5.

Furthermore, the results of said seek-contact and wear tests have revealed that the magnetic heads of Embodiments 1 through 6, having either convex or bent parts, come into contact with the recording medium less frequently in the seeking process, and neither wear or scar is observed on them. On the other hand, the magnetic heads of the comparable embodiments were found to come into contact frequently in the seeking process, and suffer scars or wear. Incidentally, although the cross-sectional shape of said convex parts is oblong in the foregoing embodiments, it has been confirmed that convex parts having a triangular or trapezoidal cross section would have similar effects.

|  | Aspect | Contacts/sec. | Degrees of wear |
|---|---|---|---|
| Embodiment 1 | 0.5 | 0.88 | No trace of wear |
|  | 1.0 | 0.65 | " |
|  | 5.0 | 0.22 | " |
|  | 10.0 | 0.01 | " |
| Embodiment 2 | 5.0 | 0.20 | " |
| Embodiment 3 | 5.0 | 0.19 | " |
| Embodiment 4 | 5.0 | 0.20 | " |
| Embodiment 5 | 0.05 | 0.70 | " |
|  | 0.1 | 0.65 | " |
|  | 0.5 | 0.30 | " |
|  | 1.0 | 0.02 | " |
| Embodiment 6 | 0.5 | 0.32 | " |
| CE 1 |  | 513 | Scars & wear powder |
| CE 2 |  | 325 | Wear powder |
| CE 3 |  | 310 | " |

Note: CE = Comparable Embodiment

Although the invention has been described with reference to specific embodiments, it is not thereby limited, but on the contrary permits modifications or variations which will become apparent to persons skilled in the art.

What is claimed is:

1. A magnetic head supporting mechanism for supporting a magnetic head over a magnetic recording medium by using a supporting spring, comprising:

a magnetic head slider on which said magnetic head is mounted, and a supporting spring having a first end with a first surface to which is fastened said magnetic head slider and which is rendered generally inflexible by attachment of said slider, a second end by which said supporting spring is connected to a support arm and which is also rendered generally inflexible by such connection, and a flexible portion having a first thickness between said two generally inflexible ends and which is provided with a plurality of convex parts on a second surface opposite said first surface that are in parallel to the seeking direction of said magnetic head slider, said plurality of convex parts increasing said first thickness and extending along said spring perpendicular to said seeking direction substantially the entire length of said flexible portion so as to increase stiffness of said supporting spring in the seeking direction to reduce a rolling motion of said magnetic head, without substantially increasing the rigidity of said supporting spring in a running direction of said magnetic head to keep small a pressure exerted by said magnetic head toward said magnetic recording medium thereby to increase a resonance frequency of said supporting spring to reduce vibration of said magnetic head.

2. A magnetic head supporting mechanism, as claimed in claim 1, wherein the aspect ratio of said convex parts ranges from 0.5 to 10.

3. A magnetic head supporting mechanism, as claimed in claim 2, wherein the material of said supporting spring is selected out of a group consisting of phosphor bronze, and silicon.

4. A magnetic head supporting mechanism for supporting a magnetic head over a magnetic recording medium, comprising:

a magnetic head slider on which said magnetic head is mounted, and a supporting spring comprising, a first end having a first surface to which is fastened said magnetic head slider and which is rendered generally inflexible by attachment of said slider, a second end by which said supporting spring is connected to a support arm and which is also rendered generally inflexible by such connection, and a flexible portion having a first thickness between said two generally inflexible ends and which is provided with a plurality of convex parts on a second surface opposite said first surface that are in parallel to a seeking direction of said magnetic head slider, said plurality of convex parts increasing said first thickness and extending along said spring perpendicular to the seeking direction at least in a part of said flexible portion immediately adjacent said first end so as to increase stiffness of said supporting spring in the seeking direction to reduce a rolling motion of said magnetic head, without substantially increasing the rigidity of said supporting spring in a running direction of said magnetic head to keep small a pressure exerted by said magnetic head toward said magnetic recording medium thereby increasing a resonance frequency of said supporting spring to reduce vibration of said magnetic head.

* * * * *